Patented Dec. 13, 1949

2,490,964

UNITED STATES PATENT OFFICE 2,490,964

BASIC ESTERS OF TRISUBSTITUTED ACETIC ACIDS

Karl Hoffmann and Henri Schellenberg, Basel, Switzerland, assignors to Ciba Pharmaceutical Products, Inc., Summit, N. J.

No Drawing. Application October 28, 1946, Serial No. 706,090. In Switzerland November 2, 1945

4 Claims. (Cl. 260—473)

1

The present invention concerns basic esters of phenylhydroxy acetic acids which contain in α-position an aliphatic hydrocarbon radical with at least 4 carbon atoms, and quaternary salts thereof.

Pharmacological tests have shown that basic esters of α-phenyl-α-hydroxy acetic acids which as a further substituent in α-position contain a phenyl radical or a cyclohexyl radical, have a spasmolytic action. This led to the belief that with basic esters of trisubstituted acetic acids, such activity depends on the presence of two cyclic substituents.

Surprisingly, compounds of this kind wherein one of these two substituents is a phenyl nucleus and the other an aliphatic radical with at least 4 carbon atoms, also show interesting therapeutic properties.

These new basic esters of trisubstituted acetic acids are prepared by converting phenyl-hydroxy-acetic acids which in α-position carry an aliphatic hydrocarbon radical with at least 4 carbon atoms, or their reactive acid derivatives, into their basic esters and in turn converting the latter, if desired, into their quaternary salts.

The trisubstituted acetic acids to be used as starting materials for the purposes of this invention may be obtained by causing benzoyl-formic acid-esters to react with organometallic compounds which are capable of converting the keto group of the benzoyl-formic acid ester into the

group, wherein R means an aliphatic hydrocarbon radical with at least 4 carbon atoms, such as, for instance, the butyl, isobutyl, amyl, hexyl, heptyl, or similar radical. For the purposes of this invention, the acetic acids thus obtained or their reactive derivatives may be caused to react with amino-alcohols or the acids or their salts may be submitted to the action of reactive esters of amino-alcohols.

There may be used in this reaction open-chain as well as cyclic amino-alcohols, more especially amino alcohols which are substituted at the nitrogen atom, such as dialkylamino-alkanols, piperidino-alkanols, or their reactive derivatives like, for instance, their esters with hydrohalic acids. It is of advantage to work in the presence of solvents and, if necessary, of condensing agents.

The esters thus obtained may then be converted into their quaternary ammonium compounds. However, the latter may as well be obtained directly by using hydroxyalkylammonium salts or their reactive derivatives as the amino alcohols prescribed for the reaction.

The products of this process may find therapeutic application.

Example 108 grams of phenyl-amyl-hydroxy-acetic acid (melting point 121–123° C., resultant from the reaction of benzoyl-formic acid-ethyl-ester with amyl-magnesium-bromide and subsequent hydrolysis of the phenyl-amyl-hydroxy-acetic acid-ethyl-ester, boiling at 142–152° C. under 12 mm. pressure, with a solution of caustic potash in methyl alcohol), 75 grams of chloro-ethyl-diethyl-amine, and 150 grams of potassium carbonate are heated for several hours on the water-bath with 1250 cc. of ethyl acetate. After filtration, the ethyl acetate is evaporated and the residual oil is distilled. The phenyl-amyl-hydroxy-acetic acid-diethyl-amino-ethyl-ester which passes over at 138° C. under 0.1 mm. pressure forms a hydrochloride of melting point 141–142° C.

By using chloro-ethyl-dimethyl-amine instead of chloro-ethyl-diethyl-amine, the dimethyl-amino-ethyl-ester of phenyl-amyl-hydroxy-acetic acid is obtained which boils at 140° C. under 0.1 mm. pressure and can be converted into the bromomethylate of melting point 192–193° C. or into the chloromethylate.

From phenyl-butyl-hydroxy-acetic acid of melting point 94–96° C. (resultant from the reaction of benzoyl-formic acid-ester with butyl-magnesium-bromide and subsequent hydrolysis), dimethyl-amino-ethyl-ester boiling at 120–123° C. under 0.05 mm. pressure is obtained (bromomethylate, melting point 192–195° C.).

Dimethyl-amino-ethyl-esters or diethyl-amino-ethyl-esters of other phenyl-alkyl-hydroxy-acetic acids, for example of phenyl-hexyl-hydroxy-acetic acid, are obtained in similar manner. There may also be prepared, for instance, the corresponding piperidino-ethyl-esters, the diethyl-amino-butyl-esters, the diallyl-amino-ethyl-esters, the morpholino-ethyl-esters, the methyl-propyl-amino-ethyl-esters as well as quaternary salts of these compounds.

The appended claims are directed to the phenylamyl compounds of the foregoing example.

Having thus disclosed the invention, what we claim is:

1. A member of the group consisting of compounds of the formula

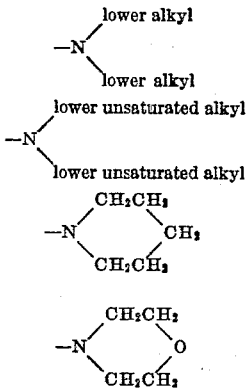

and quaternary lower alkylammonium salts thereof, A is a lower alkylene radical and Y is selected from the group consisting of and 2. Phenyl-amyl-hydroxy-acetic acid-dimethyl-amino-ethyl-ester.

3. Phenyl-amyl-hydroxy-acetic acid-dimethyl-amino-ethyl-ester-halogen-methylate.

4. Phenyl-amyl-hydroxy-acetic acid-dimethyl-amino-ethyl-ester-bromo-methylate of melting point 192–193° C.

KARL HOFFMANN.
HENRI SCHELLENBERG.

REFERENCES CITED

The following references are of record in the file of this patent:

UNITED STATES PATENTS

| Number | Name | Date |
|---|---|---|
| 2,265,184 | Miescher et al. | Dec. 9, 1941 |

OTHER REFERENCES

Gilman et al., "Jour. Pharm. & Exp. Thera.," vol. 74–75 (1942), p. 298.

Blicke et al., "Jour. Am. Chem. Soc.," vol. 65 (1943), pp. 1967–1970.